United States Patent [19]
McKee

[11] 3,802,732
[45] Apr. 9, 1974

[54] ROOF RAISING DEVICE FOR RECREATIONAL VEHICLE

[76] Inventor: William A. McKee, Box 349 Cassapolis St., R. No. 3, Cassapolis, Mich. 49031

[22] Filed: Feb. 5, 1973

[21] Appl. No.: 329,549

Related U.S. Application Data

[63] Continuation-in-part of Ser. No. 181,948, Sept. 20, 1971, abandoned.

[52] U.S. Cl............................ 296/23 R, 296/26, 52/66
[51] Int. Cl............................................... B60p 3/32
[58] Field of Search............ 296/23 R, 23 MC, 23 C, 296/26, 27, 137 B, 137 C; 52/66, 67

[56] References Cited
UNITED STATES PATENTS

| | | | |
|---|---|---|---|
| 3,582,130 | 6/1971 | Borskey | 296/23 R |
| 3,160,436 | 12/1964 | Duddleston | 296/26 |
| 3,572,812 | 3/1971 | Norcia | 296/26 |
| 2,656,216 | 10/1953 | Bobroff | 296/23 C |

*Primary Examiner*—Philip Goodman
*Assistant Examiner*—John A. Carroll
*Attorney, Agent, or Firm*—Woodhams, Blanchard & Flynn

[57] ABSTRACT

A recreational camper vehicle having means defining a room having a lower room portion and an upper vertically collapsible and vertically foldable room portion carried over the lower room portion and effectively comprising an upper extension thereof. The upper room portion has a base part therearound at the bottom and has a top part therearound at the top thereof. A vertically collapsible and foldable upper room portion is provided with a vertically collapsible and foldable sidewall connected vertically between the base part and the top part. A pneumatic circuit is provided having a plurality of pneumatically operated power cylinders, pneumatic pump means and driving means therefor, accumulator means, pneumatic pressure switch means, conduit means connected in, pneumatic circuit between the power cylinders and the accumulator means and pneumatic valve means for controlling the vertical movability of the vertically collapsible and foldable upper room portion.

9 Claims, 5 Drawing Figures

PATENTED APR 9 1974

INVENTOR
WILLIAM A. MCKEE
BY
Woodhams, Blanchard & Flynn
ATTORNEYS

ROOF RAISING DEVICE FOR RECREATIONAL VEHICLE

This application is a continuation-in-part application of Ser. No. 181,948, filed Sept. 20, 1971, now abandoned.

FIELD OF THE INVENTION

This invention relates to a recreational camper vehicle and, more particularly, relates to a recreational camper vehicle having a fully pneumatically operated system for controlling the vertical position of a vertically collapsible and vertically foldable room portion and for supplying pressurized gas to an auxiliary outlet for the purpose of permitting an inflation of recreational devices, such as inflatable toys for use in water as well as inflating the tires on the recreational camper vehicle.

BACKGROUND OF THE INVENTION

The provision in recreational vehicles of a vertically collapsible and vertically foldable room portion which is positioned over a lower room portion and effectively comprising an upper extension thereof has been known and is considered old in the art. However, the systems for raising and lowering the vertically collapsible and vertically foldable room portion have involved a rather complicated apparatus which is difficult to install and increases the cost of the recreational vehicle. Accordingly, an improvement in the system for raising and lowering the vertically collapsible and vertically foldable room portion which is less expensive to build than the known systems is highly desirable.

Further, during the use of the recreational vehicle having the aforementioned vertically collapsible and vertically foldable room portion, the system for raising the upper room portion has oftentimes been a slow and cumbersome process. In the known systems which use a hydraulic fluid, for example, the passage of a sufficient quantity of hydraulic fluid through the conduits in the system for causing the power cylinders to raise the upper room portion has been a very time consuming process and limits the quickness with which a camp site can be set up. Further, leaks oftentimes develop within the hydraulic system which are inconvenient to fix due to the fact that the hydraulic fluid will seep behind finished portions of the inside of the recreational vehicle and necessitates a removal of interior decorations in order to repair the leak. Oftentimes the leak is so small as to be insignificant to the operation of the unit but yet a certain quantity of hydraulic fluid will collect behind the interior decoration material and eventually requires a correction of the problem primarily due to the smell of hydraulic fluid. The correction of this problem is expensive, if done by experienced and trained personnel, particularly factory trained people, and in systems where the recreational vehicle is warrantied for a certain period of time, causes the manufacturer to increase the price of the recreational vehicle to offset any possibilities of malfunctions which may come under the warranty provisions. Accordingly, a system for raising the upper room system which is essentially insensitive to minor leakage problems is highly desirable. Further, it is highly desirable to provide a system which will raise the upper room portion as quickly as possible in order to facilitate a quick set up of a camp site.

Once a camp site has been set up, it is always necessary to unpack the various items of equipment contained in the camper vehicle and it is sometimes necessary to inflate various recreational items for use in water, such as inner tubes and floating toys for the children. Heretofore, it was necessary to take these items, especially a large inner tube, to a convenient gasoline station so that the inner tube could be inflated. This is not always convenient when the only mode of transportation at the camp site is the camper vehicle. To inflate an inner tube prior to reaching the camp site destination would require the usage of too much valuable space within the camper vehicle for conveniently transporting same to the camp site.

Accordingly, a system which will provide a high pressure air outlet to permit the quick inflation of recreational items such as inner tubes and floating toys for the children is highly desirable from the standpoint of minimizing, as much as possible, the necessity of having to travel away from the camp site to have these items inflated quickly and conveniently and with a minimum of physical labor.

Accordingly, the objects of this invention are:

1. To provide, in a recreational camper vehicle having an upper vertically collapsible and vertically foldable room portion positioned over a lower room portion and effectively comprising an upper extension thereof, a fully pneumatically operable system for raising the upper room portion quickly and quietly.

2. To provide in a recreational camper vehicle, as aforesaid, a fully pneumatic system which minimizes the criticality of the existence of small leaks in the system and thereby minimizes the necessity of the manufacturer from having to repair the leaks under the usual warranty provisions on recreational camper vehicles.

3. To provide a recreational camper vehicle, as aforesaid, a fully pneumatic system wherein the noise generating components, such as the pump and motor, are mountable in the vehicle engine compartment to minimize the noise generated thereby.

4. To provide a fully pneumatic system having an auxiliary outlet for permitting the inflation of various recreational inflatable items, such as toys for children's use in water.

5. To provide a fully pneumatic system which is easy to install in a recreational vehicle and at less expense than the automated lifting systems as known heretofore.

6. To provide a fully pneumatic system which will permit the individual ones of the pneumatic cylinders to raise and lower the roof in accordance with the amount of resistance generated by the weight of the roof member due to snow, clothes hanging from the roof structure inside the vehicle and the like without effecting a deformation or warping of the roof structure.

Other objects and purposes of this invention will become apparent to persons familiar with this type of equipment upon a reading of the following specification and an inspection of the accompanying drawing, in which.

Figure 1:
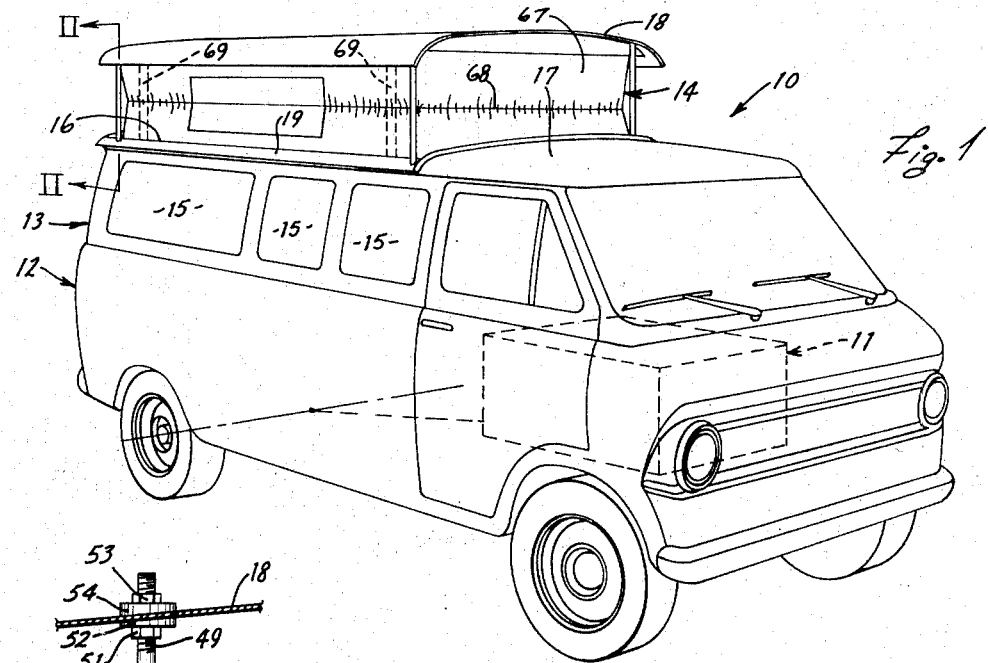
FIG. 1 is a perspective view of a recreational camper vehicle embodying the invention.

Certain terminology will be used in the following descriptive material for convenience in reference only and will not be limiting. The words "up" and "down," will designate directions in the drawing to which reference is made. The words "in" and "out" will refer to directions toward and away from, respectively, the geometric center of the device and designated parts thereof. Such terminology will include derivatives and words of similar import.

SUMMARY OF THE INVENTION

The objects and purposes of this invention are met by providing a recreational camper vehicle having means defining a room portion and an upper vertically collapsible and vertically foldable room portion carried over the lower room portion and effectively comprising an upper extension thereof. The upper room portion has a base part therearound at the bottom and a top part therearound at the top. The vertically collapsible and foldable upper room portion is provided with vertically collapsible and foldable sidewalls connected vertically between the base part and the top part. A plurality of elongated pneumatically operable power cylinders each have a cylinder portion secured to the base part and extending downwardly therefrom into the lower room portion. The pneumatically operable power cylinders each include a piston movable longitudinally therein and have a rod secured thereto for extensible and retractable movement relative to the cylinder. The free end of the rod remote from the piston is secured to the upper vertically collapsible and vertically foldable room portion. A pneumatic pump and driving apparatus therefor is provided for producing a pressurized gas at an outlet thereof. Accumulator means are provided and connected in pneumatic circuit with the output port of the pneumatic pump and adapted to accumulate a pressurized gas therein. A pneumatic pressure switch is connected in circuit with the accumulator and adapted to control the energization of the pneumatic pump in response to the accumulated pressure in the accumulator. Conduit means are connected in pneumatic circuit between the cylinder and beneath the pistons for supplying a pressurized gas to the cylinder to raise the top of the upper vertically collapsible and vertically foldable room portion. A pneumatic valve is also connected in circuit with the conduit means for controlling the supply of the pressurized gas to the cylinder portion of the power cylinder. The pneumatic valve includes an exhaust port for exhausting the pressurized gas in the conduit means and the power cylinder means to facilitate a collapsing or a lowering of vertically collapsible and vertically foldable room portion.

DETAILED DESCRIPTION

A recreational camper vehicle 10 is illustrated in FIG. 1 and embodies the invention. The vehicle 10 is a self-propelled device having a conventional internal combustion engine and transmission means therein and schematically illustrated by the broken line representation 11. The camper vehicle 10 includes a room defining body structure 12 having a plurality of window openings 15 therein. Access from the outside to the room defining structure may be provided through additional doors in the body structure not illustrated. The body structure 12 encloses a lower room portion 13.

An opening 16 is provided in the roof 17 of the body structure 12. In this particular embodiment, the opening 16 is a rectangular shape. An upper room portion 14 having a top 18 is mounted over the opening 16 and comprises an upper extension to the lower room portion 12.

Figure 2:
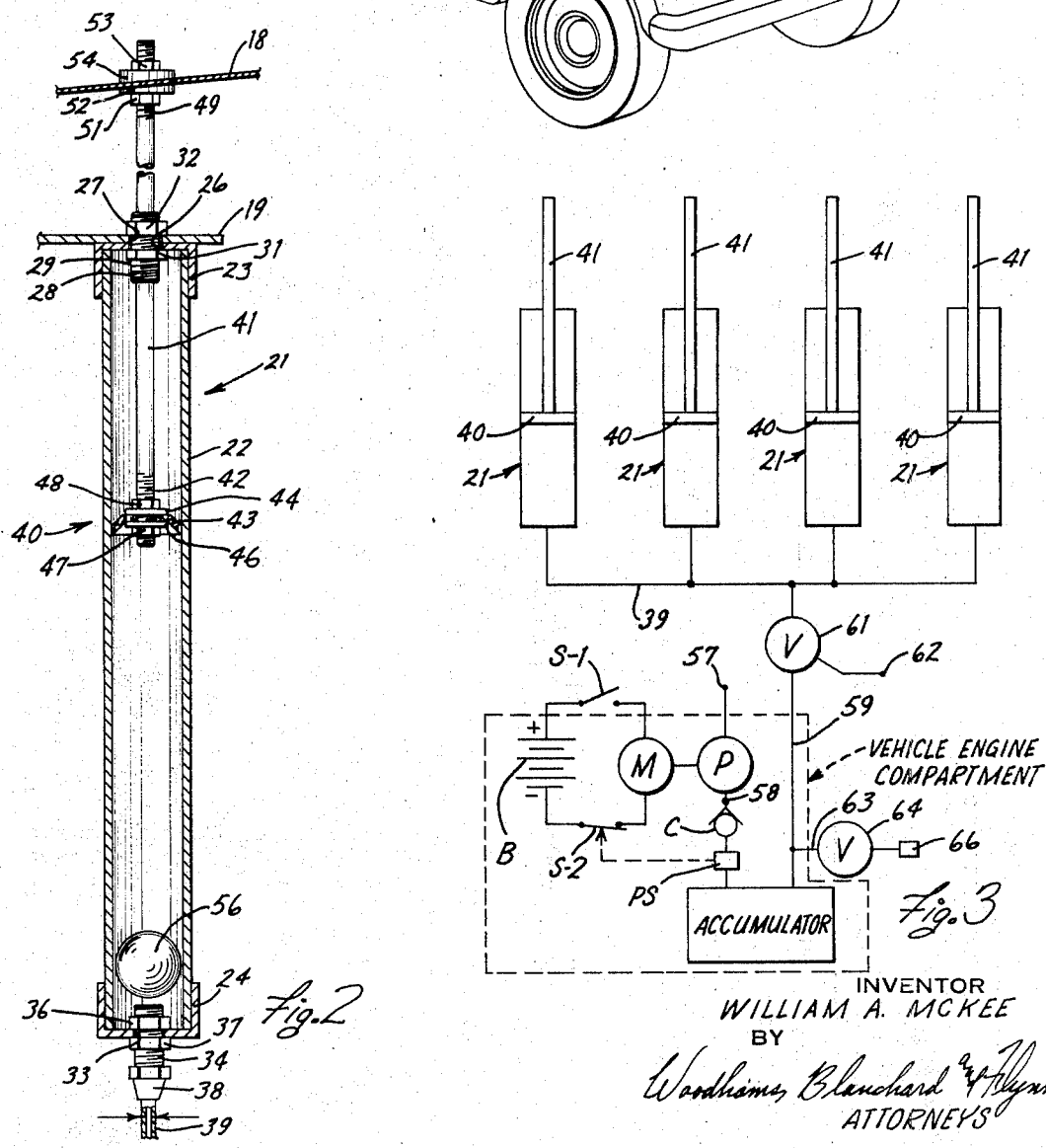
FIG. 2 is a longitudinal sectional view through one of the pneumatically operated power cylinders.

A rectangular-shaped frame or bottom part 19 is mounted over the opening 16 and encircles same. The frame 19 is secured by any convenient means, as by welding, to the peripheral edges of the opening 16 to fixedly secure same to the roof 17 of the body structure 12. A plurality of pneumatically operated power cylinders 21 are secured to the frame 19 adjacent each corner thereof. Other power cylinders may be provided as necessary, however, each power cylinder 21 (FIG. 2) is identical to the other and comprises an elongated hollow tubular body portion 22 having cup-shaped end caps 23 and 24 fixedly secured to the opposite ends thereof. The end cap 23 has an opening 26 therein aligned with an opening 27 in the frame 19 the openings 26 and 27 are adapted to receive a hollow sleeve 28 having a thread 29 on the exterior surface thereof. A nut 31 is threadedly engaged to the thread 29 on the lower end of the sleeve 28 and engages the inside surface of the cup-shaped end cap 23. A nut 32 is threadedly secured to the upper end of the sleeve 28 and engages the upper surface of the frame 19. The two nuts 31 and 32 serve to secure the power cylinder 21 to the frame 19.

The end cap 24 has an opening 33 therein and is adapted to receive a hollow sleeve 34 having an external thread thereon. A pair of nuts 36 and 37 are threadedly engaged with the sleeve 34 on opposite sides of the end wall of the cup-shaped end cap 24 to fixedly secure the sleeve 34 to the cup-shaped end cap 24. A tube coupling 38 is threadedly engaged with the lower end of the sleeve 34, which tube coupling 38 couples a tubular conduit 39 thereto for supplying a pressurized gas to the interior of the hollow tubular body portion 22.

An elongated rod 41 is slidably disposed through an opening through the hollow sleeve 28. A thread 42 is provided on the lower end of the rod 41 and is adapted to receive a piston assembly 40 comprising a flexible washer 43, such as a leather washer, and a pair of metal washers 44 and 46 on the upper and lower sides thereof, respectively. A nut 47 is threadedly engaged with the thread 42 on the rod 41 on the lower side of the washer 46 and is threaded into engagement with the metal washer 46. A nut 48 is threadedly engaged with the thread 42 on the rod 41 on the upper side of the metal washer 44 and is threaded downwardly into an engagement with the metal washer 44 so that the two nuts 47 and 48 serve to clamp the flexible washer 43 between the metal washers 44 and 46. The diameter of the flexible washer 43 is preferably slightly greater than the internal diameter of the tubular body 22 so as to define a sliding and sealing fit therebetween.

A thread 49 is provided on the upper end of the rod 41 and is adapted to be received in an opening in gusset member 18A of the top 18 of the upper room portion 14. The threaded end 49 is adapted to receive a nut 51 and washer 52 on the lower side of the roof 58 and a nut 53 and a metal washer 54 on the upper part of the gusset member 18A. The pair of nuts 51 and 53 are then adapted, when threaded in a direction where the two nuts move toward each other, to clamp the gusset member 18A between the metal washers 52 and 54. Thus, the rods 41 of each of the power cylinders 21 will support the top 18 when in the extended position.

A resilient spherical-shaped ball 56 may be provided inside the tubular body portion 22 of the power cylinder 21 and is particularly positioned below the piston structure 43 and is free to move longitudinally between the bottom end of the body portion 22 and the piston assembly 40. In this particular embodiment, the ball 56 is made of a rubber material. The diameter of the ball 56 is slightly less than the internal diameter of the tubular body portion 22 of the power cylinder 21 to permit the movement of pressurized gas thereby.

Figure 3:
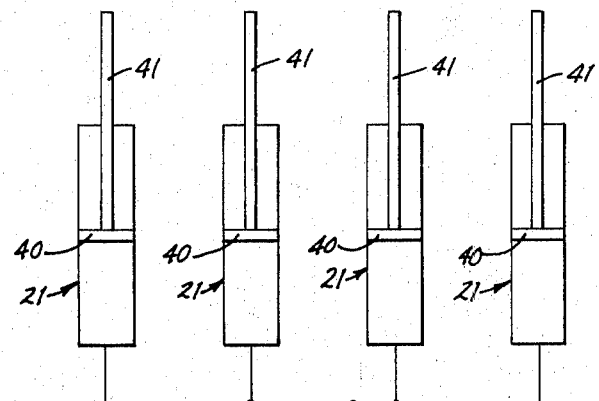
FIG. 3 is a pneumatic circuit diagram embodied in the recreational camper vehicle.

Referring now to FIG. 3, in the vehicle engine compartment, an electric motor M or the like is connected through a pair of switches S-1 and S-2 to the vehicle battery B. The switch S-1 is a manually controlled switch mounted inside the vehicle preferably on or near the dashboard and operable by a person within the vehicle. The switch S-2 is a pressure sensitive switch responsive to the gas pressure accumulated in the accumulator. The motor M drives a pneumatic pump P which draws air in at an intake port 57 and pressurizes same at an outlet port 58 and pumps same through a check valve C and a pressure switch PS to the accumulator. A conduit 59 is connected to the output of the accumulator and supplies pressurized gas through a manually controlled valve 61 to the conduit 39 leading to each of the plurality of power cylinders 31. The valve 61 is also adapted to be manually controlled to permit pressurized gas to flow from the conduit 39 through the valve 61 to an exhaust port 62 opened to the atmosphere.

An auxiliary conduit 63 is connected in circuit with the conduit 59 to supply pressurized gas from the accumulator through a manually controlled valve 64 to an auxiliary outlet 66. The auxiliary outlet 66 is adapted to receive any conventional type of pressure hose fitting or the like to permit pressurized gas to be utilized for inflating the vehicle tires and/or inflatable recreational devices for use in water, such as inner tubes and the like.

A vertically collapsible and foldable sidewall 67 made of any convenient material, such as canvas, is connected between the top 18 and the frame 19. An elastic band 68 is provided midway between the top 18 and the frame 19 to draw the central portion of the sidewalls 67 inwardly of the vehicle when the top 18 is retracted to the collapsed position. When the top is in the extended or uncollapsed position illustrated in FIG. 1, a plurality of safety support braces 69 may be provided and positioned between the top 18 and the frame 19 for supporting the top 18 in the raised position. Thereafter, the valve mechanism 61 may be manually actuated to cause the pressurized gas in the conduits 39 to be vented to the atmosphere through the exhaust port 62 so that the top 18 will be fully supported on the braces 69.

OPERATION

Although the operation of the device will be readily apparent to skilled persons, a brief summary thereof will be given for convenience.

The upper room portion 18 may be moved from the collapsed position, wherein the top 18 is closely positioned to the roof 17, to the position illustrated in FIG. 1 by closing the switch S-1. The switch S-2 of the pressure switch mechanism PS will be initially closed due to a low pressure in the accumulator so that the power from the battery B will be transmitted to the motor M to effect a driving of the pump P. Pressurized gas will accumulate in the accumulator until the pressure is sufficient to cause the pressure switch mechanism PS to open the switch S-2. At this point, or even at an earlier point in time, the valve 61 may be opened to cause the passage of pressurized gas from the conduit 59 into the conduits 39 to supply pressurized gas to the lower end of each of the pistons 40 in the power cylinders 21. The pressurized gas will effect a very rapid raising of the top 18 to the position illustrated in FIG. 1. The safety support bars 69 may then be positioned between the top 18 and the frame 19 so that the valve 61 can thereafter be activated to depressurize the conduits 39 by connecting same through the valve 61 to the exhaust port 62.

The size of the opening through the conduit 39 is in the range of 1/16 inch to ¼ inch I.D. tubing. The use of this small diameter tubing, usually copper or other type of flexible tubing, facilitates an easy installation into the vehicle body 12 and since most tubing of this size is generally highly flexible it is easy to work with and thereby simplifies the installation. When ¼ inch I.D. copper tubing is utilized and the gas pressure in the accumulator is 90 psi, the roof 18 can be raised in approximately 1 second and within the range of about 0.5 seconds to 1.5 seconds.

ALTERNATE CONSTRUCTION

Figure 4:
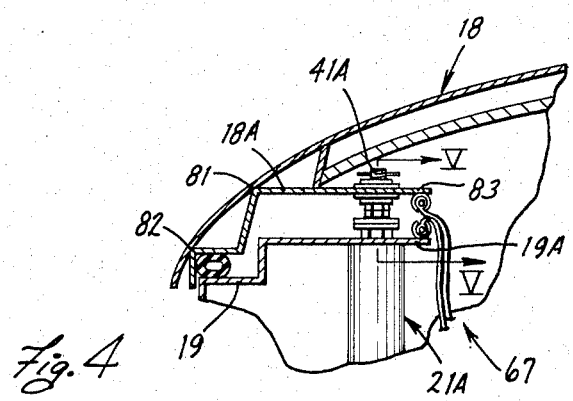
FIG. 4 is a fragmentary sectional view of a portion of the recreational camper vehicle adjacent a pneumatically operated power cylinder.

FIG. 4 illustrates in more detail the structure in and around the position wherein a power cylinder 21A, particularly the rod 41A thereof and the structure for securing the rod 41A to the roof structure 18. More specifically, the roof 18 comprises a gusset member 18A which is secured to the underside of the roof 18 as at 81 and 82 by any convenient means such as welding. The gusset member 18A comprises at least one horizontally extending flange portion 83 having a hole 84 (FIG. 5) therein.

Figure 5:
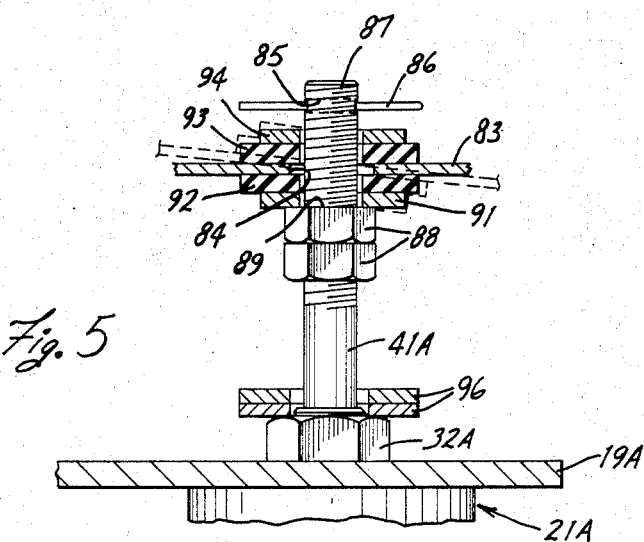
FIG. 5 is an enlarged sectional view taken along the line V—V of FIG. 4.

Referring now to FIG. 5, the upper end of the rod 41A has an opening 85 provided therein which extends perpendicular to the diameter of the rod 41A. The opening 85 is adapted to receive a pin 86 therethrough which is longer than the width of the opening 85. The upper end of the rod 41A is threaded as at 87 and receives a pair of nuts 88 lockingly engaged against relative movement thereon, the upper surface 89 of the uppermost nut 88 serving to define a surface upon which to mount a conventional washer 91 and a conventional resilient washer 92 such as rubber. The upper end of the rod 41A is received in the opening 84 in the flange 83 and another resilient washer 93 and another washer 94 is placed on the rod 41A. The pin 86 is inserted into the opening 85 in the upper end of the rod 41A, hold the washers 93 and 94 between the flange 83 and the pin 86.

A pair of shims 96 are supported on the upper surface of the nut 32A on the upper end of the cylinder 21A. The shims 96 serve to prevent a loosening of the nut 32A and causing the cylinders to become disconnected from the frame 19A when the roof structure is in the position illustrated in FIG. 4 and the vehicle is traveling down the highway. It has been noted heretofore that vibrations of the top 18 relative to the vehicle body cause a loosening of the nut 32A and a disassembling of the pneumatic cylinder structure from the frame. The shims are relatively rotatable and any relative movement between the nut 88 and the nut 32A is absorbed by the shims 96.

The purpose of the structure set forth in FIG. 5 is to permit a cocking of the roof structure relative to the rod without effecting a permanent deformation of the roof structure. It has been noticed that during the winter months snow will accumulate on the top of the vehicle and/or alternatively, clothes may be hung on the interior surface of the roof so that when the operator activates the circuit necessary to raise the roof, greater resistance will be presented to one or more of the power cylinders than to the remaining power cylinders so that the least loaded power cylinders will raise the roof portion adjacent thereto before the remaining power cylinders will lift the heavier portion of the roof. As a result, there is a moment in time during which the roof structure is inclined upwardly from the heaviestly loaded portion of the roof to the least loaded portion of the roof. This creates a permanent deformation of the roof structure if the connection is made rigid. However, when no snow is present on the roof and when no other weights have been added to the roof structure, the power cylinders will raise the roof at essentially an equal rate so that there is no tendency for the roof to become cocked or inclined and, therefore, permanently deformed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a recreational camper vehicle having means defining a room having a lower room portion and an upper vertically collapsible and vertically foldable room portion carried over said lower room portion and effectively comprising an upper extension thereof, said upper room portion having a base frame therearound at the bottom thereof and having a top part therearound at the top thereof, said vertically collapsible and foldable upper room portion being provided with vertically collapsible and foldable sidewall means connected vertically between said base frame and said top part thereof, the improvement comprising:

a plurality of elongated pneumatically operable power cylinder means each having a cylinder portion secured to said base frame and extending downwardly therefrom into said room portion, means defining a piston movable longitudinally of said cylinder portion and a rod secured to said piston for extensible and retractable movement relative to said cylinder portion, the free end of said rod remote from said piston means being secured to said top part of said vertically collapsible and vertically foldable room portion;

pneumatic circuit means connected in pneumatic circuit between said plurality of pneumatically operable power cylinder means for supplying pressurized gas to said cylinder portions to raise said upper vertically collapsible and vertically foldable room portion; and means for permitting a relative movement between said rod and said top part whereby, if said power cylinders are unevenly loaded, the least loaded power cylinder in said plurality of power cylinders will be permitted to raise the roof portion associated therewith before the heavier loaded power cylinders raise the roof portions associated therewith.

2. A recreational vehicle according to claim 1, wherein said pneumatic circuit means comprises pneumatic pump means, including means for driving same, for producing said pressurized gas at an output port thereon, accumulator means connected in pneumatic circuit with said output port and adapted to accumulate said pressurized gas therein, pneumatic pressure switch means connected in circuit with said accumulator means and adapted to control the energization of said pneumatic pump means in response to the accumulated pressure in said accumulator means, conduit means connected in pneumatic circuit between said cylinder portion beneath said piston for supplying said pressurized gas to said cylinder to raise said upper vertically collapsible and vertically foldable room portion, and manually operable pneumatic valve means connected in circuit with said conduit means for controlling the supply of said pressurized gas to said cylinder portion of said power cylinder means, said pneumatic valve means including an exhaust port for exhausting said pressurized gas in said conduit means and said power cylinder means to facilitate a collapsing or a lowering of the vertically collapsible and vertically foldable room portion.

3. A recreational camper vehicle according to claim 1, wherein said recreational vehicle comprises a battery, an internal combustion engine and transmission means and is thereby self propelled and wherein said pneumatic pump means and said driving means therefor is mounted adjacent said engine.

4. A recreational camper vehicle according to claim 3, wherein said driving means for said pneumatic pump means is adapted to be energized from said battery.

5. A recreational camper vehicle according to claim 1, including a auxiliary conduit means connected in pneumatic valve means for controlling the passage of pressurized gas to an outlet thereof from said auxiliary conduit means.

6. A recreational vehicle according to claim 1, including support means positionable between said base frame and said top part to permit said pneumatic valve means to exhaust said air supply to thereby effect a support of said top part in the raised position.

7. A recreational camper vehicle according to claim 1, wherein the internal diameter of said conduit means is in the range of 1/16 to ¼ inch.

8. In a recreational camper vehicle having means defining a room having a lower room portion and an upper vertically collapsible and vertically foldable room portion carried over said lower room portion and effectively comprising an upper extension thereof, said upper room portion having a base frame therearound at the bottom thereof and having a top part therearound at the top thereof, said vertically collapsible and foldable upper room portion being provided with vertically collapsible and foldable sidewall means connected vertically between said base frame and said top part thereof, the improvement comprising:

a plurality of elongated pneumatically operable power cylinder means each having a cylinder portion secured to said base frame and extending downwardly therefrom into said lower room portion, means defining a piston movable longitudinally of said cylinder portion and a rod secured to said piston for extensible and retractible movement relative to said cylinder portion, the free end of said rod remote from said piston means being secured to said top part of said upper vertically collapsible and vertically foldable room portion;

pneumatic pump means, including means for driving same, for producing a pressurized gas at an output port thereon;

accumulator means connected in pneumatic circuit with said output port and adapted to accumulate pressurized gas therein;

pneumatic pressure switch means connected in circuit with said accumulator means and adapted to control the energization of said pneumatic pump means in response to the accumulated pressure in said accumulator means;

conduit means connected in pneumatic circuit between said cylinder portion beneath said piston for supplying said pressurized gas to said cylinder to raise said upper vertically collapsible and vertically foldable room portion;

manually operable pneumatic valve means connected in circuit with said conduit means for controlling the supply of said pressurized gas to said cylinder portion of said power cylinder means, said pneumatic valve means including an exhaust port for exhausting said pressurized gas in said conduit means and said power cylinder means to facilitate a collapsing or a lowering of the vertically collapsible and vertically foldable room portion; and resilient ball in said cylinder portion positioned between the bottom end of said cylinder portion and said piston means, said resilient ball occupying less space than the internal diameter of said cylinder portion to permit said pressurized gas to pass around said resilient means to permit a raising or lowering of said vertically collapsible and vertically foldable room portion.

9. In a recreational camper vehicle having means defining a room having a lower room portion and an upper vertically collapsible and vertically foldable room portion carried over said lower room portion and effectively comprising an upper extension thereof, said upper room portion having a base frame therearound at the bottom thereof and having a top part therearound at the top thereof, said vertically collapsible and foldable upper room portion being provided with vertically collapsible and foldable sidewall means connected vertically between said base frame and said top part thereof, the improvement comprising:

a plurality of elongated pneumatically operable power cylinder means each having a cylinder portion secured to said base frame and extending downwardly therefrom into said lower room portion, means defining a piston movable longitudinally of said cylinder portion and a rod secured to said piston for extensible and retractible movement relative to said cylinder portion, the free end of said rod remote from said piston means being secured to said top part of said upper vertically collapsible and vertically foldable room portion;

pneumatic pump means, including means for driving same, for producing a pressurized gas at an output port thereon;

accumulator means connected in pneumatic circuit with said output port and adapted to accumulate pressurized gas therein;

pneumatic pressure switch means connected in circuit with said accumulator means and adapted to control the energization of said pneumatic pump means in response to the accumulated pressure in said accumulator means;

conduit means connected in pneumatic circuit between said cylinder portion beneath said piston for supplying said pressurized gas to said cylinder to raise said upper vertically collapsible and vertically foldable room portion;

manually operable pneumatic valve means connected in circuit with said conduit means for controlling the supply of said pressurized gas to said cylinder portion of said power cylinder means, said pneumatic valve means including an exhaust port for exhausting said pressurized gas in said conduit means and said power cylinder means to facilitate a collapsing or a lowering of the vertically collapsible and vertically foldable room portion; and auxiliary conduit means connected in pneumatic circuit with said conduit means and having pneumatic valve means for controlling the passage of pressurized gas to an outlet thereof from said auxiliary conduit means.

* * * * *